(12) United States Patent
Abreu (10) Patent No.: US 11,412,164 B1
(45) Date of Patent: Aug. 9, 2022

(54) METHOD, APPARATUS, AND SYSTEM FOR RESIDUAL ROW NOISE REMOVAL

(71) Applicant: Carl Zeiss AG, Oberkochen (DE)

(72) Inventor: David Abreu, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/372,492

(22) Filed: Jul. 11, 2021

(51) Int. Cl.
    *H04N 5/225*     (2006.01)
    *H04N 5/357*     (2011.01)
    *H04N 9/04*     (2006.01)

(52) U.S. Cl.
    CPC ....... *H04N 5/3575* (2013.01); *H04N 9/04557* (2018.08)

(58) Field of Classification Search
    CPC .... H04N 5/361; H04N 5/363; H04N 9/04515; G06T 3/4015; G06T 5/002; G06T 2207/20182
    See application file for complete search history.

(56) References Cited

U.S. PATENT DOCUMENTS

| | | | |
|---|---|---|---|
| 10,789,684 B2 | 9/2020 | Prentice et al. | |
| 2010/0309344 A1* | 12/2010 | Zimmer | G06T 5/20 |
| | | | 348/E9.037 |
| 2012/0249828 A1* | 10/2012 | Sun | H04N 9/04557 |
| | | | 348/E9.051 |
| 2014/0098265 A1* | 4/2014 | Hosaka | H04N 9/04553 |
| | | | 348/246 |
| 2017/0011497 A1* | 1/2017 | Chien | G06T 5/20 |
| 2019/0378246 A1* | 12/2019 | Prentice | G06T 3/4015 |
| 2022/0051369 A1* | 2/2022 | Chen | G06T 5/002 |

OTHER PUBLICATIONS

Yanpeng Cao et al., "Spatially Adaptive Column Fixed-Pattern Noise Correction in Infrared Imaging System Using 1D Horizontal Differential Statistics," in IEEE Photonics Journal, vol. 9, No. 5, pp. 1-13, Oct. 2017, Art No. 7803513, doi: 10.1109/JPHOT.2017.2752000.

* cited by examiner

*Primary Examiner* — Timothy J Henn
*Assistant Examiner* — Dwight Alex C Tejano
(74) *Attorney, Agent, or Firm* — Falk Ewers; Ewers IP Law PLLC (57) ABSTRACT

A method, an image processing apparatus, and a non-transitory computer readable storage medium encoded with software for residual row noise removal in digital images are provided. The residual row noise is removed by dividing color plane images into vertical stripes and for each vertical stripe masking out the stripe pixels, determining a row means profile, determining a smoothed row means profile, determining row offset values for each of the horizontal stripe rows, determining corrected row offset values for horizontal stripe rows based on corresponding row offset values of adjacent vertical stripes and subtracting the corrected row offset value from the stripe pixel values.

15 Claims, 7 Drawing Sheets

FIG. 6

METHOD, APPARATUS, AND SYSTEM FOR RESIDUAL ROW NOISE REMOVAL

TECHNICAL FIELD

The disclosure relates to residual row noise removal in digital images. Further, the disclosure relates to a method, an image processing apparatus, and a non-transitory computer readable storage medium encoded with software for residual row noise removal in digital images.

BACKGROUND

Digital cameras include image sensors to capture digital images. These image sensors typically use either charge coupled device (CCD) technology or complementary metal oxide semiconductor (CMOS) technology. Image sensors using CMOS technology are often referred to as CMOS sensors.

Image sensors detect a light intensity per pixel. To allow color information to be recorded, color filter arrays (CFA) may be bonded to the substrate of the image sensor which allocate a certain color to a certain pixel, and each pixel detects the light intensity for the specific color.

A typical pattern for a CFA used in digital cameras is a Bayer filter or Bayer CFA. A Bayer filter contains alternating rows of red and green filters and blue and green filters, wherein each row contains alternating red and green filters and blue and green filters, respectively. Green filters preferentially allow green light photons to pass to the detector (e.g., a photodiode) of the respective pixel of the image sensor. At the same time, red and blue light photons that arrive at the green filter are not transmitted by the filter and, therefore, not detected by the respective detector. Similarly, red filters preferentially allow red light photons and blue filters preferentially allow blue light photons to pass to the respective detector.

The green channel represents the luminance and the red and blue channels represent the chrominance of the digital image. When a Bayer filter is applied in front of an image sensor, the resulting image frame produced by the image sensor needs to be interpolated or demosaiced to reproduce all three colors for each pixel so that the original full-color resolution digital image can be displayed, printed or stored.

In digital cameras, interpolating or demosaicing may be performed by specialized image signal processors (ISPs), or by general purpose processors (CPUs) which execute image processing software programs.

Digital images typically contain noise from various sources that needs to be reduced. The need for reduction increases with International Organization for Standardization (ISO) sensitivity.

CMOS sensors are typically read out row by row, i.e., row-wise. Such a readout process induces temporal row noise in the raw sensor signal, which is a constant random offset for all pixels in a same row. In addition, for a specific row, the value of the offset may change from frame to frame.

In the raw sensor signal, the row noise is mixed with pixel noise which has two components, namely temporal pixel noise and fixed pattern noise. Temporal pixel noise is a noise that randomly changes from frame to frame. Fixed pattern noise is a noise that creates a constant pixel offset which is present in each frame.

Temporal pixel noise and fixed pattern noise are typically removed from the raw sensor data in two noise removing processing steps. In a first noise removing processing step, optical black pixel correction is performed and in a second noise removing processing step, dark frame correction is performed. Optical black pixel correction is typically utilized to remove temporal row noise and dark frame correction is typically utilized to remove fixed pattern noise.

For optical black pixel correction, on both sides of the active area, pixels are arranged which are insensitive to light. These pixels are called optical black pixels. For each row, the mean value of these optical black pixels is subtracted from all pixels in the row in order to correct the temporal row noise.

For dark frame correction, a dark frame is subtracted from the image. Depending on the exposure parameters, either a dark frame is captured right after a bright frame, or previously calibrated dark frames are used for this type of correction. In the latter case, two dark frames are typically captured, one at low sensor temperature and one at high sensor temperature. The current sensor temperature during capture is the utilized to interpolate between these two dark frames.

Ideally, the only remaining noise left after these two noise removing processing steps is temporal pixel noise. This remaining noise can be removed for instance with multi-level bilateral noise filtering as described, e.g., in U.S. Pat. No. 10,789,684 B2.

However, it has been shown that the above-described row noise correction does not work sufficiently in every instance. As a result, it has been found that residual row noise can still be present in the raw sensor signal despite performing the noise removing processing steps described above. Therefore, new approaches are needed which improve the effectiveness of the noise filtering processing, and in particular, which effectively remove the residual row noise.

SUMMARY

It is an object of the disclosure to provide a method, an image processing apparatus, a system, and a computer-readable storage medium for residual row noise removal from an image frame that overcome the disadvantages of the related art.

As discussed above, images often include "noise banding" or residual row noise which becomes visible in images taken with high ISO values, e.g., ISO values larger than 6400, in images taken with large exposure times, e.g., with exposure times larger than 1 second, or when dark areas of mid-ISO images (with ISO values between 400 and 1600) are stretched in post-processing.

Unlike regular pixel noise, most post-processing programs, e.g., Adobe Photoshop Lightroom, do not have the capability of removing row noise properly. Therefore, images captured by a camera which exhibit strong noise banding are typically not usable by photographers.

It has been shown that despite temporal pixel noise correction and fixed pattern noise correction, residual row noise remains in the image frame due to the following limitations.

Temporal pixel or row noise is typically performed by optical black pixel correction. However, there is only a limited amount of optical black pixels available to estimate the temporal row noise. This estimation therefore suffers from a rest error due to the temporal pixel noise of the optical black pixels. At this point, the offset error is the same for all pixels in a row.

Fixed pattern noise is typically removed by dark frame correction. If a dark frame is captured directly after a bright frame and subtracted from it, then the temporal row and pixel noise increase by 41%, making the optical black correction less effective. If factory-calibrated dark frames are used, then the fixed pattern noise is corrected without increasing temporal noise, but potential errors in interpolation between hot and cold dark frames may add additional row noise to the image.

Furthermore, even after applying optical black pixel correction and dark frame correction, there are still some further processing steps that may amplify and distort the residual row noise, and in particular induce a variation of the offset error across the row.

In addition, optical black pixel correction and dark frame correction have already been fully optimized and perform in the best possible way. Therefore, additional measures are needed to remove the residual row noise such that not only the operation of the image processing apparatus is improved, but also such that raw images captured by the image processing apparatus are usable by photographers.

On the one hand, it might be possible to re-tune the sensor registers to reduce temporal noise. However, this is a long process which would also be followed by a long period of testing to make sure nothing else broke in the process. Moreover, all camera sensors would then have to be re-calibrated, which is not feasible since many cameras are already in use.

As an alternative, the only remaining option appears to be to correct the residual row noise with an algorithm for residual row noise removal. There are some algorithms described in the related art which attempt to correct row or column noise directly on images, e.g., Y. Cao et al., "Spatially Adaptive Column Fixed-Pattern Noise Correction in Infrared Imaging System Using 1D Horizontal Differential Statistics," in IEEE Photonics Journal, vol. 9, no. 5, pp. 1-13, Oct. 2017, Art no. 7803513, doi: 10.1109/JPHOT.2017.2752000. However, these algorithms typically involve many computations to separate properly noise from image content. These large additional computations would impair operation of the image processing device.

A general idea of the present disclosure is therefore to evaluate and correct the residual row noise after all processing steps that happen before the image is saved as a raw image. The image is therefore still in a Bayer pattern form, in which each pixel has, e.g., a 14-bit grey value. Since the processing steps described above are always applied separately on the color channels, e.g., on four color channels R, Gr, Gb, and B, the residual row noise removal will also be applied on the four channels separately. However, this is not limited thereto, and other channel separations are also possible, such as separation in three red, green, and blue (RGB) channels as described with regard to FIG. 2 below.

An assumption resulting from the analysis above is that the issue is originally an imperfect correction of the temporal row noise leading to a remaining small row offset.

Since the issue is a small row offset, it is enough to analyze dark areas of the image. It has been found that an offset error in a bright area is much less visible. In addition, bright objects with stripes would corrupt the estimation. Thus, only the darkest pixels of the image are considered to estimate the offset error.

In addition, due to further processing steps, this offset varies slightly across columns in one row of pixels. This variation is of low frequency, meaning that neighboring pixels will still have the same offset. For this reason, the offset variation along columns is considered by dividing the images into several vertical stripes and calculating the offsets independently for each stripe. The offsets for one stripe are then corrected with the offsets from the neighboring stripes to avoid sudden jumps in the image.

These corrected offsets are then applied to each stripe separately and the stripes are stitched together to produce the corrected image. Based on a large image database, the algorithm is fast and very effective in removing residual row noise on various scenes and exposure parameters.

In view of the foregoing, the object is achieved by a method for removing residual row noise. The method includes receiving from an image sensor an image frame including a color mosaic having a color filter array (CFA) pattern, decomposing the image frame into at least one color plane image for each of a plurality of color planes, removing the residual row noise in the at least one color plane image by dividing the at least one color plane image into a plurality of vertical stripes having stripe pixels with stripe pixel values, and dividing each of the plurality of vertical stripes into horizontal stripe rows defining stripe row pixels with stripe row pixel values and vertical stripe columns defining stripe column pixels with stripe column pixel values.

For each of the plurality of vertical stripes, the method continues with selecting non-masked pixels by masking out the stripe pixels with the stripe pixel values that are larger than a predetermined pixel value, determining a row means profile by determining row mean values for each of the horizontal stripe rows, determining a smoothed row means profile by applying a filter to the row mean values thereby generating smoothed row means values for each of the horizontal stripe rows, determining row offset values for each of the horizontal stripe rows by subtracting the smoothed row mean values from the row mean values, determining corrected row offset values for each of the horizontal stripe rows based on corresponding row offset values of adjacent vertical stripes, and subtracting the corrected row offset value from the stripe pixel values.

The method further includes reconstructing the at least one color plane image to generate a corrected color plane image.

According to an aspect of the disclosure, the plurality of color planes includes at least one of a green color plane, a red color plane, and a blue color plane.

According to another aspect of the disclosure, the filter is at least one of an edge-preserving filter, a bilateral filter, a guided filter, and a moving average filter.

According to yet another aspect of the disclosure, determining the corrected row offset values for each of the horizontal stripe rows of a vertical stripe includes determining a corrected row offset value for each of the horizontal stripe rows of the vertical stripe by linear interpolating each of the corrected row offset values from offset values in a same horizontal stripe row (a) of a first vertical stripe preceding the vertical stripe in a horizontal direction, and (b) of a second vertical stripe succeeding the vertical stripe in the horizontal direction.

The object is also achieved by providing an image processing apparatus for removing residual row noise. The image processing apparatus including one or more processors in communication with an image sensor, and one or more memory devices in communication with the one or more processors.

The one or more processors are configured to receive from an image sensor an image frame including a color mosaic having a color filter array (CFA) pattern, decompose the image frame into at least one color plane image for each of a plurality of color planes, remove the residual row noise in the at least one color plane image by dividing the at least one color plane image into a plurality of vertical stripes having stripe pixels with stripe pixel values, dividing each of the plurality of vertical stripes into horizontal stripe rows defining stripe row pixels with stripe row pixel values and vertical stripe columns defining stripe column pixels with stripe column pixels.

For each of the plurality of vertical stripes, non-masked pixels are selected by masking out the stripe pixels with the stripe pixel values that are larger than a predetermined pixel value, a row means profile is determined by determining row mean values for each of the horizontal stripe rows, a smoothed row means profile is determined by applying a filter to the row mean values thereby generating smoothed row means values for each of the horizontal stripe rows, row offset values are determined for each of the horizontal stripe rows by subtracting the smoothed row means values from the row mean values, corrected row offset values are determined for each of the horizontal stripe rows based on corresponding row offset values of adjacent vertical stripes, and the corrected row offset value is subtracted from the stripe pixel values.

According to an aspect of the disclosure, the one or more processors are further configured to reconstruct the at least one color plane image to generate a noise filtered image frame.

According to another aspect of the disclosure, the plurality of color planes includes at least one of a green color plane, a red color plane, and a blue color plane.

According to a further aspect of the disclosure, the filter is at least one of an edge-preserving filter, a bilateral filter, a guided filter, and a moving average filter.

According to yet another aspect of the disclosure, determining the corrected row offset values for each of the horizontal stripe rows of a vertical stripe includes determining a corrected row offset value for each of the horizontal stripe rows of the vertical stripe by linear interpolating each of the corrected row offset values from offset values in a same horizontal stripe row (a) of a first vertical stripe preceding the vertical stripe in a horizontal direction, and (b) of a second vertical stripe succeeding the vertical stripe in the horizontal direction.

The object is further achieved by a non-transitory computer readable storage medium encoded with software including computer executable instructions that when executed by one or more processors cause the one or more processors to receive from an image sensor an image frame including a color mosaic having a color filter array (CFA) pattern, decompose the image frame into at least one color plane image for each of a plurality of color planes, remove the residual row noise in the at least one color plane image by dividing the at least one color plane image into a plurality of vertical stripes having stripe pixels with stripe pixel values, dividing each of the plurality of vertical stripes into horizontal stripe rows defining stripe row pixels with stripe row pixel values and vertical stripe columns defining stripe column pixels with stripe column pixels, for each of the plurality of vertical stripes selecting non-masked pixels by masking out the stripe pixels with the stripe pixel values that are larger than a predetermined pixel value, determining a row means profile by determining row mean values for each of the horizontal stripe rows, determining a smoothed row means profile by applying a filter to the row mean values thereby generating smoothed row means values for each of the horizontal stripe rows, determining row offset values for each of the horizontal stripe rows by subtracting the smoothed row means values from the row mean values, determining corrected row offset values for each of the horizontal stripe rows based on corresponding row offset values of adjacent vertical stripes, and subtracting the corrected row offset value from the stripe pixel values.

According to an aspect of the disclosure, the executable instructions further cause the one or more processors to reconstruct the at least one color plane image to generate a noise filtered image frame.

According to another aspect of the disclosure, the plurality of color planes includes at least one of a green color plane, a red color plane, and a blue color plane.

According to a further aspect of the disclosure, the filter is at least one of an edge-preserving filter, a bilateral filter, a guided filter, and a moving average filter.

According to yet another aspect of the disclosure, determining the corrected row offset values for each of the horizontal stripe rows of a vertical stripe includes determining a corrected row offset value for each of the horizontal stripe rows of the vertical stripe by linear interpolating each of the corrected row offset values from offset values in a same horizontal stripe row (a) of a first vertical stripe preceding the vertical stripe in a horizontal direction, and (b) of a second vertical stripe succeeding the vertical stripe in the horizontal direction.

BRIEF DESCRIPTION OF THE DRAWINGS

The disclosure will now be described with reference to the drawings, wherein.

DESCRIPTION OF EXEMPLARY EMBODIMENTS

Exemplary embodiments of the disclosure will be explained below with reference to the accompanying schematic figures. Features that coincide in their nature and/or function may in this case be provided with the same designations throughout the figures.

The terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" may refer both to the situation in which no further element aside from B is provided in A (that is to say to a situation in which A is composed exclusively of B) and to the situation in which, in addition to B, one or more further elements are provided in A, for example element C, elements C and D, or even further elements.

Furthermore, the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Also, the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person of ordinary skill in the art, can also be carried out using other configurations. Similarly, features introduced by "in one embodiment of the invention" or "in one exemplary embodiment of the invention" are to be understood to be optional features, without this being intended to restrict alternative refinements or the scope of protection of the independent claims. Furthermore, all possibilities of combining the features introduced by these introductory expressions with other features, whether optional or non-optional features, are intended to remain unaffected by said introductory expressions.

Figure 1:
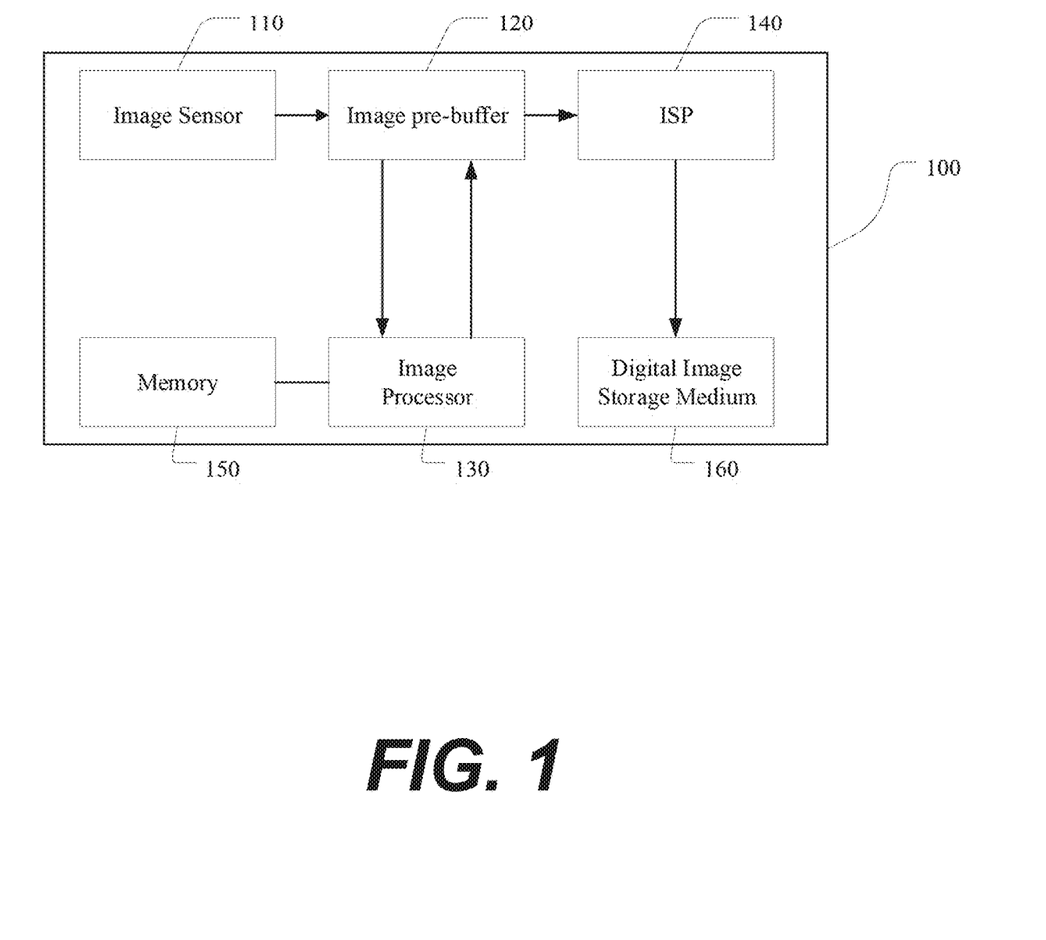
FIG. 1 shows a schematic illustration of an image processing apparatus according to an exemplary embodiment of the disclosure.

FIG. 1 shows an image processing apparatus 100 configured for residual row noise removal in digital images. The image processing apparatus 100 includes an image sensor 110, an image pre-buffer 120 connected to the image sensor 110 and to image processor 130 and Image Signal Processor (ISP) 140. Image processing apparatus 100 further includes memory 150 which is in communication with image processor 130. The image processing apparatus 100 further includes digital image storage medium 160 which is in communication with ISP 140.

The image sensor 110 can be operated in a live view mode and in a still capture mode. In both modes, the full active area of the image sensor 110 is utilized, and an image frame is generated and outputted by the image sensor 110 to the image pre-buffer 120.

The memory 150 and the digital image storage medium 160 are non-transitory computer readable storage media, for example, solid-state drives (SSD), but are not limited thereto. Any other non-transitory computer readable storage medium or a plurality of non-transitory computer readable storage media can be also utilized as the memory 150 or the digital image storage medium 160.

Figure 2:
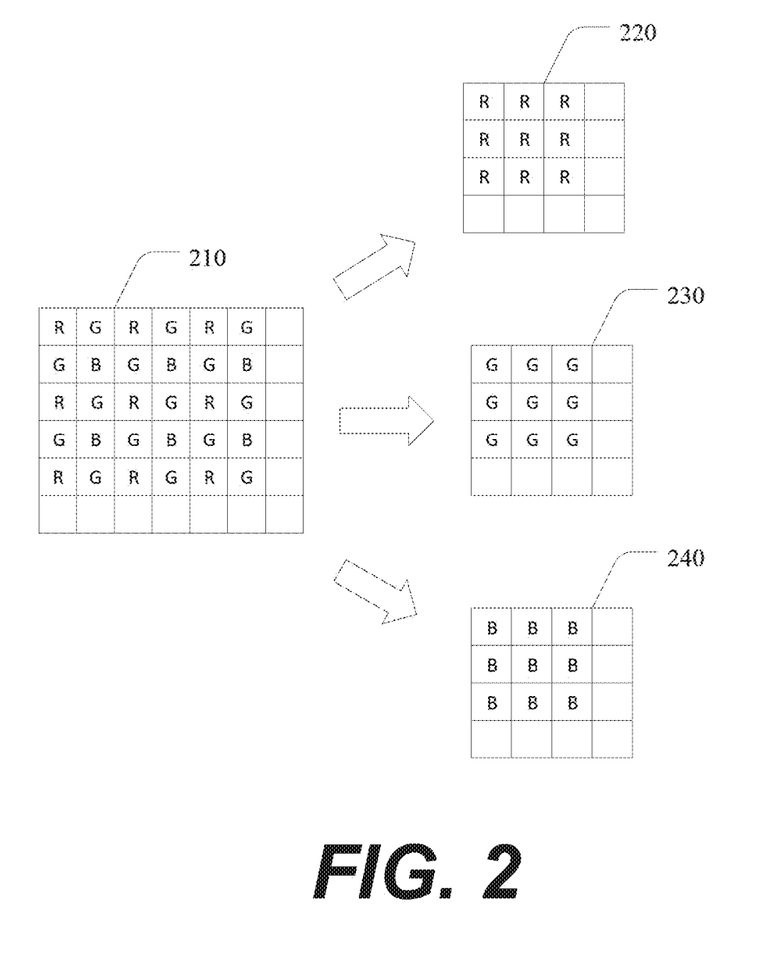
FIG. 2 shows an illustration of a plane separation according to an exemplary embodiment of the disclosure.

Reference is now made to FIG. 2 (with further reference to FIG. 1). FIG. 2 shows an illustration of plane separation. A CFA, and in particular a Bayer CFA may be bonded to image sensor 110. As a result, the image frames generated by the image sensor 110 include a color mosaic with a Bayer CFA pattern. FIG. 2 shows a portion of an image frame 210 which is received from the image sensor 110 and stored in image pre-buffer 120. As shown in FIG. 2, the image frame 210 includes alternating rows of red and green pixels and of blue and green pixels. Pixels of the same color represent a color plane or color channel. The Bayer CFA pattern is decomposed into three color plane images, namely, the red color plane image 220, the green color plane image 230, and the blue color plane image 240 by the image processor 130 prior to removing the residual row noise to permit residual row noise to be removed for each color plane independently. The green channel represents the luminance of the digital image and the red and blue channels represent the chrominance of the image frame 210. In addition to the Bayer CFA, other filters, e.g., the Fujifilm-X-Trans filter, are also customary, and the principles described herein with regard to residual row noise removal in digital images can also be applied to any other filter, such as the Fujifilm-X-Trans filter.

After decomposing the image frame 210 into the red, green, and blue color plane images, the image processor 130 sequentially and separately removes residual row noise in each of the color planes by performing operations described in further detail below with reference to FIGS. 4 to 6. Thereafter, the image processor 130 reconstructs the red, green, and blue color plane images 220, 230, and 240, respectively, to generate a corrected color plane image. Subsequently, the image frame is transmitted to ISP 140 where it is interpolated or demosaiced to a viewable image and stored in digital image storage medium 160.

Figure 3:
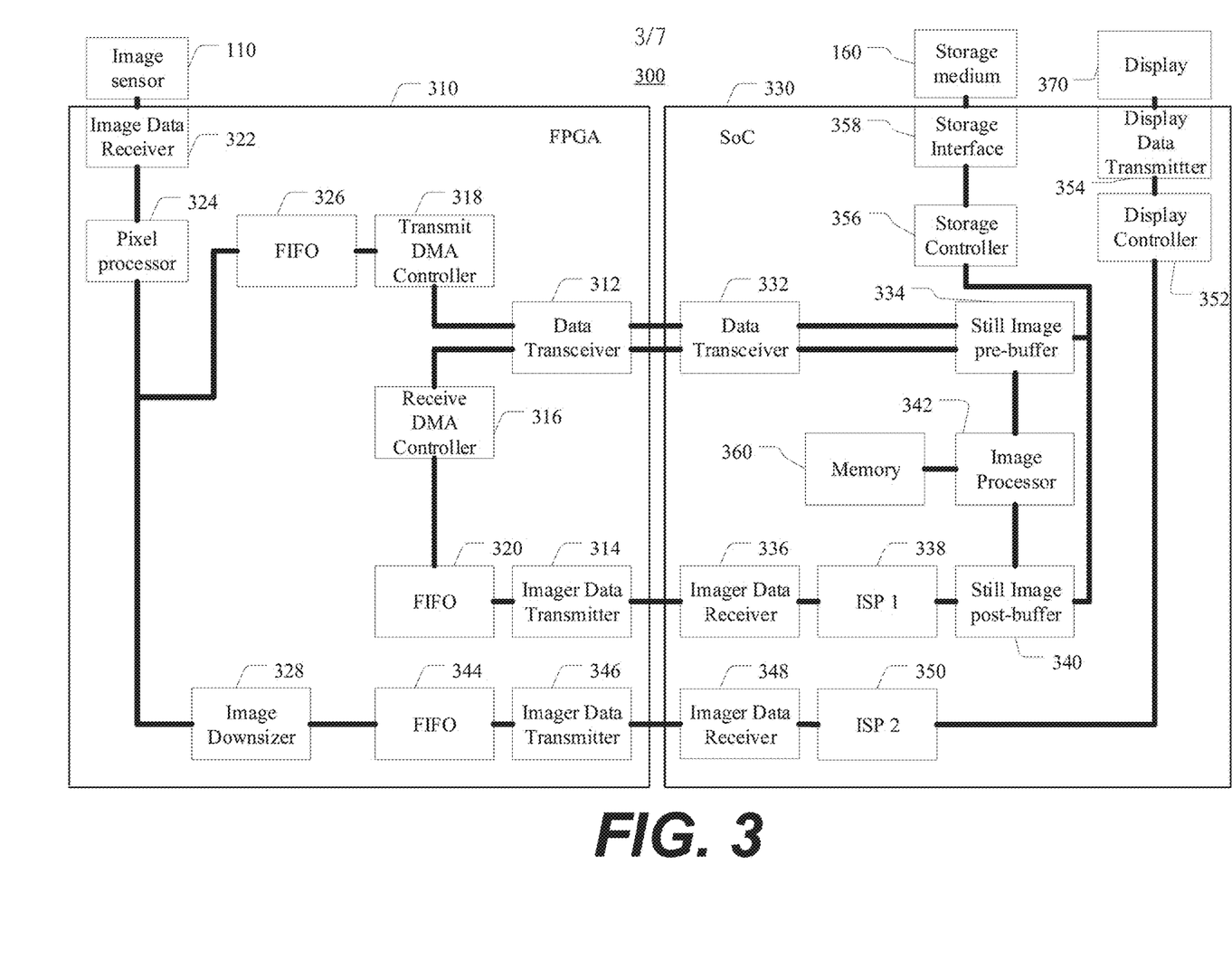
FIG. 3 shows a detailed schematic illustration of an image processing apparatus according to an exemplary embodiment of the disclosure.

Reference is now made to FIG. 3, which shows a more detailed schematic illustration of an image processing apparatus 300 for processing digital images according to an exemplary embodiment of the disclosure. As shown in FIG. 3, the image processing apparatus 300 includes an image pre-processing device 310 to which image sensor 110 is connected, and an image main processing device 330. The image main processing device 330 is in communication with image pre-processing device 310, display 140, and storage medium 160.

The image main processing device 330 in the exemplary embodiment of the image processing apparatus 300 shown in FIG. 3 has a system on chip (SoC) architecture and integrates all components necessary to process an image frame received from an image sensor to generate digital images that can be displayed, printed or stored. Thus, image main processing device 330 includes image processor 342 which may be implemented, for example, as a digital signal processor (DSP) or a graphics processing unit (GPU). Image main processing device 330 further includes a first ISP 338 and data transceiver 332 configured to receive and transmit image frames to be stored in still image pre-buffer 334. In addition, an image data receiver 336 is provided which is configured to receive image subframes to be processed by the ISP 338. The image subframes processed by the ISP 338 are stored in still image post-buffer 340. A display controller 352 is provided which performs operations to allow the image frame captured by the image sensor 110 to be visible on the entire display 140. The display controller 352 is connected to the display 370 via display data transmitter 354. To store still image frames in a graphics image format or image frames in a raw image format in the storage medium 160, a storage controller 356 and a storage interface 358 are provided.

The image pre-processing device 310 includes a data transceiver 312 and a first imager data transmitter 314. Data transceiver 312 and data transceiver 332 form a data interface between the image pre-processing device 310 and the image main processing device 330. The data transceiver 312, 332 may be a high-speed serial computer expansion bus standard interface, such as a Peripheral Component Interconnect Express (PCIe) standard interface, but is not limited thereto.

Like the data transceiver 312, 332, the imager data transmitter 314 together with the imager data receiver 336 form another interface (i.e., an imager data interface) between the image pre-processing device 310 and the image main processing device 330. Data transceiver 312 and imager data transmitter 314 are controlled by receive DMA (RDMA) controller 316 and transmit DMA (TDMA) controller 318. RDMA controller 316 is in communication with imager data transmitter 314 via first in first out (FIFO) buffer 320. Image pre-processing device 310 also includes image data receiver 322 and pixel processor 324 which is in communication with transmit DMA controller 318 via FIFO buffer 326.

The first and second imager data interfaces 314, 336 and 346, 348 according to the exemplary embodiment shown in FIG. 3 are Mobile Industry Processor Interface (MIPI) Camera Serial Interface (CSI) image data interfaces. The imager data interfaces, however, are not limited to MIPI CSI and any other serial interfaces can also be utilized instead.

In the exemplary embodiment shown in FIG. 3, the image pre-processing device 310 is implemented as a field-programmable gate array (FPGA). However, the image pre-processing device 310 may also be implemented as an application-specific integrated circuit (ASIC). Similarly, the image processor 342 may also be implemented as a separate FPGA or a separate ASIC. As discussed below, the removal of residual row noise is performed by the image processor 342.

Image pre-processing device 310 further includes image downsizer 328 that is connected via FIFO buffer 344 to a second imager data transmitter 346 that forms together with a second imager data receiver 348 a second imager data interface. The imager data receiver 348 is connected to a second ISP 350.

Removal of residual row noise is performed by image processor 342. An image frame 210 generated by the image sensor 110 is stored in still image pre-buffer 334 before it is decomposed by image processor 342 into color plane images in which residual row noise is sequentially and separately removed in each of the color planes before the color plane images are reconstructed to generate a corrected color plane image that is stored in still image pre-buffer and thereafter transmitted to ISP 338 via data transceiver 332 and 312 and imager data transmitter 314 and imager data receiver 336 where it is interpolated or demosaiced to a viewable image and stored in digital image storage medium 160.

Figure 4A:
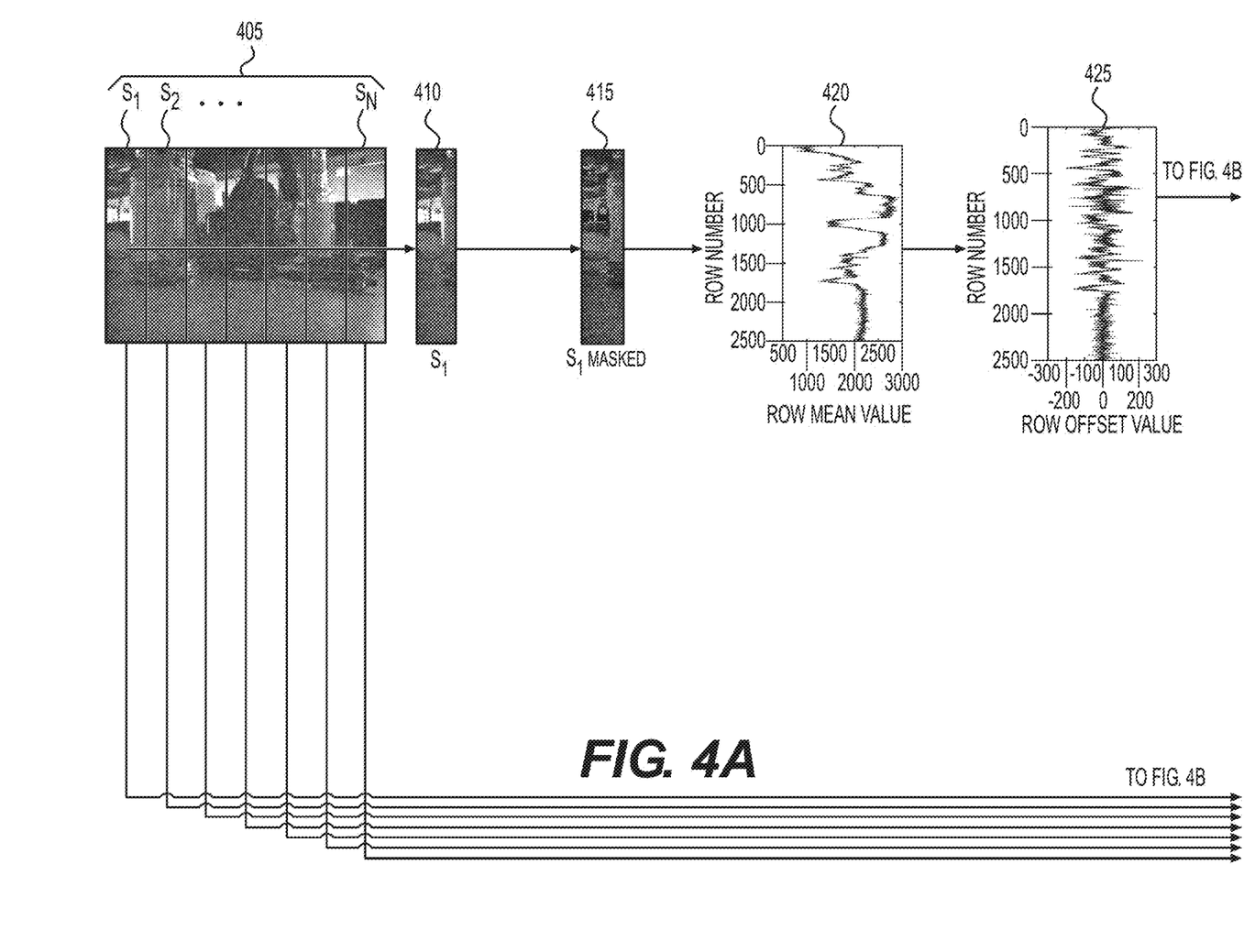
FIGS. 4A and 4B show a schematic illustration of a denoising algorithm according to an exemplary embodiment of the disclosure.
Figure 4B:
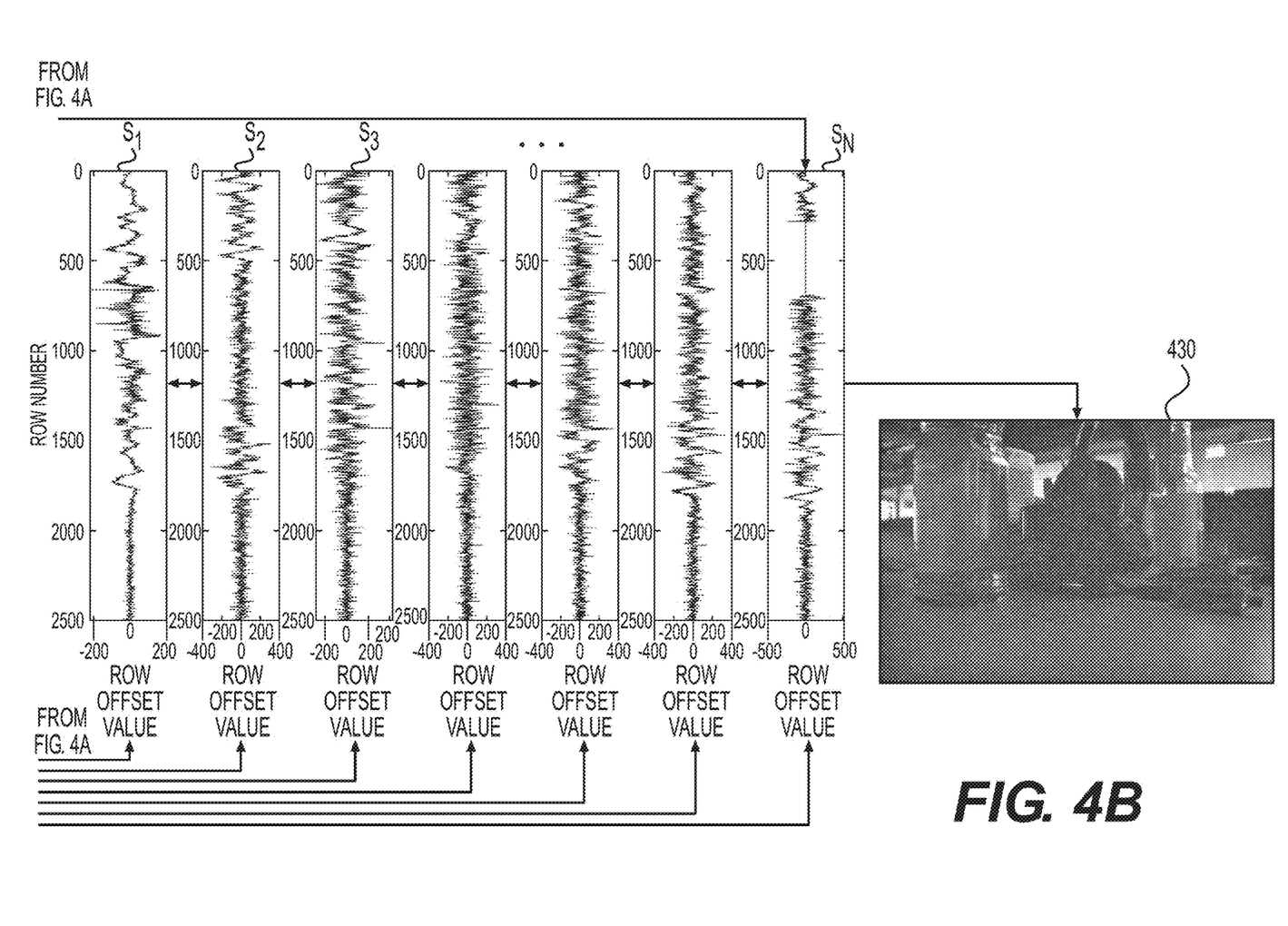

FIGS. 4A and 4B show a schematic illustration of a denoising algorithm for removal of residual row noise. FIG. 4A shows a color plane image 405. The color plane image 405 is divided into a plurality of vertical stripes $S_1, S_2, \ldots, S_N$. Vertical stripe 410 in FIG. 4A corresponds to vertical stripe $S_1$. FIG. 4A further shows a masked stripe 415 which is obtained when non-masked pixels are selected by masking out stripe pixels with stripe pixel values that are larger than a predetermined pixel value.

Each of the vertical stripes is divided into horizontal stripe rows defining stripe row pixels. Vertical stripe 410, for example, is divided into 2,500 horizontal stripe rows. As shown in FIG. 4A, a row means profile 420 is determined from the masked stripe 415 by determining row mean values for each of the horizontal stripe rows. From the row means profile 420, a smoothed row means profile is determined by applying a filter to the row means values thereby generating smoothed row means values for each of the 2,500 horizontal stripe rows. Row offset values 425 for each of the horizontal stripe rows are determined by subtracting the smoothed row means values from the row mean values of the row means profile 420.

The row offset values for each of the vertical stripes $S_1, S_2, \ldots, S_N$ are shown in FIG. 4B in further detail. Corrected row offset values for each of the 2,500 horizontal stripe rows of adjacent vertical stripes, e.g., of vertical stripes $S_1, S_2$, and $S_3$ in FIG. 4B are determined and subtracted from the corresponding stripe pixel values of the corresponding vertical stripes. In other words, the corrected row offset values replace the row offset values shown in FIG. 4B and the corrected row offset values for each row 1 to 2,500 of a vertical stripe shown in FIG. 4B are subtracted from the corresponding stripe row pixel values of corresponding vertical stripes $S_1, S_2, \ldots, S_N$ shown in FIG. 4A. The color plane image 405 is then reconstructed to generate corrected color plane image 430.

Figure 5:
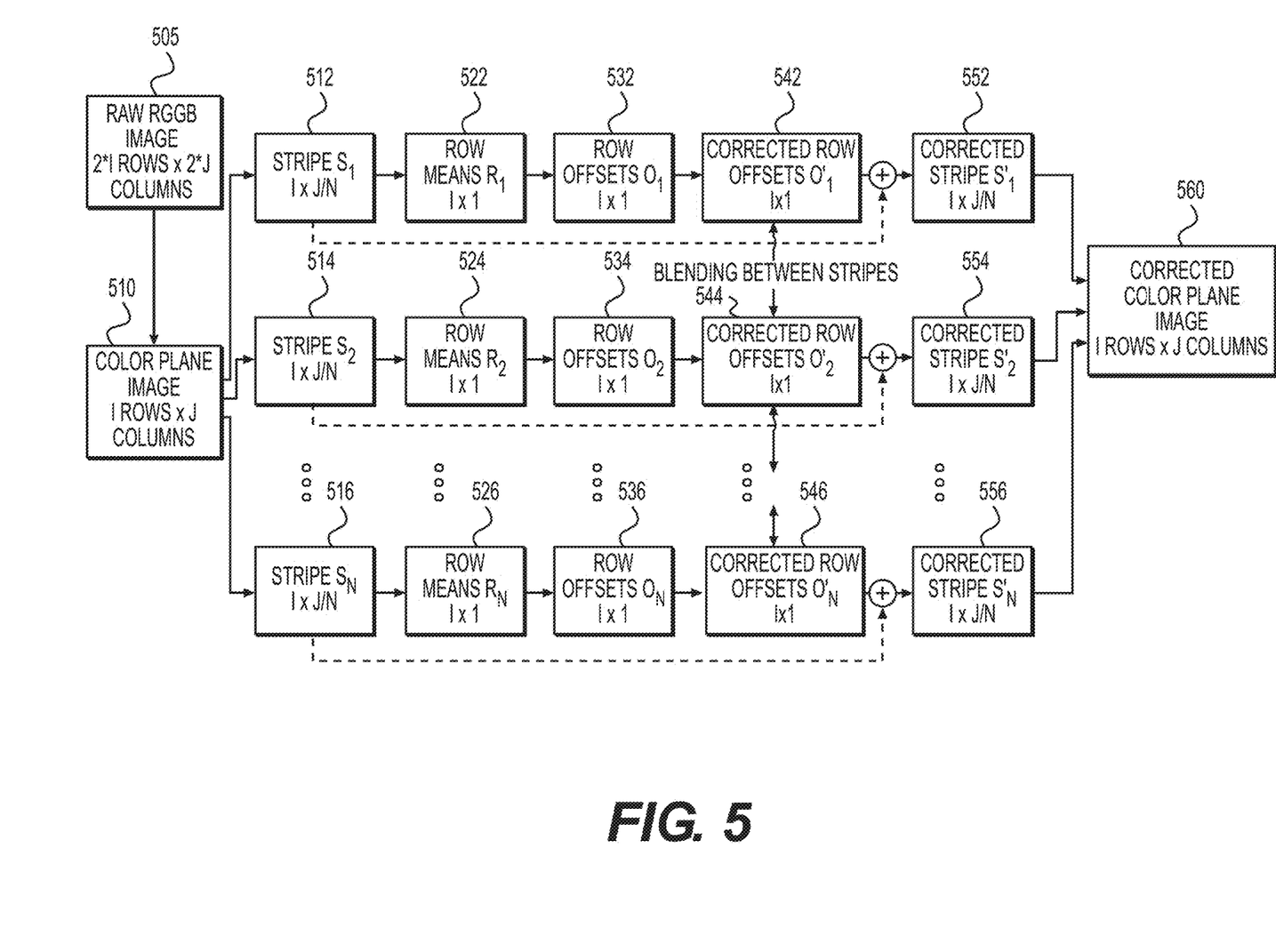
FIG. 5 shows a detailed illustration of the denoising algorithm according to an exemplary embodiment of the disclosure.

Referring now to FIG. 5, which shows a detailed illustration of the denoising algorithm for removing residual row noise. As shown in FIG. 5, a raw red, green, green, and blue (RGGB) image or image frame 505 is received from image sensor 110. Raw RGGB images are color images that are obtained from image sensors with a Bayer CFA. The filter pattern is half green, one quarter red and one quarter blue. Therefore, the filter pattern is also called RGGB pattern. However, any other filter or color pattern is possible, and the principles described herein with regard to residual row noise removal in digital images can also be applied to these other filters or color patterns. The raw RGGB image 505 is decomposed into at least one color plane image 510. The at least one color plane image 510 is divided into a plurality of vertical stripes 512, 514, and 516 which correspond to vertical stripes $S_1, S_2, \ldots S_N$, respectively, shown in FIG. 4A.

For each of the vertical stripes 512, 514, and 516, row mean values 522, 524, and 526, also described as row means $R_1, R_2, \ldots R_N$, respectively, are determined which undergo a two-step optimization during which row offset values 532, 534, and 536 (also described as row offsets $O_1, O_2, \ldots, O_N$, respectively) and corrected row offset values 542, 544, and 546 are determined (which correspond to corrected row offsets $O'_1, O'_2, \ldots O'_N$, respectively) based on corresponding row offset values of adjacent vertical stripes, also referred to as blending between stripes. The corrected row offset values 542, 544, and 546 are then subtracted from stripe pixel values of respective vertical stripes 512, 514, and 516 which result in corrected stripes 552, 554, and 556 (also referred to as $S'_1, S'_2, \ldots, S'_N$, respectively).

The corrected stripes 552, 554, and 556 are then reconstructed to generate corrected color plane image 560.

Figure 6:
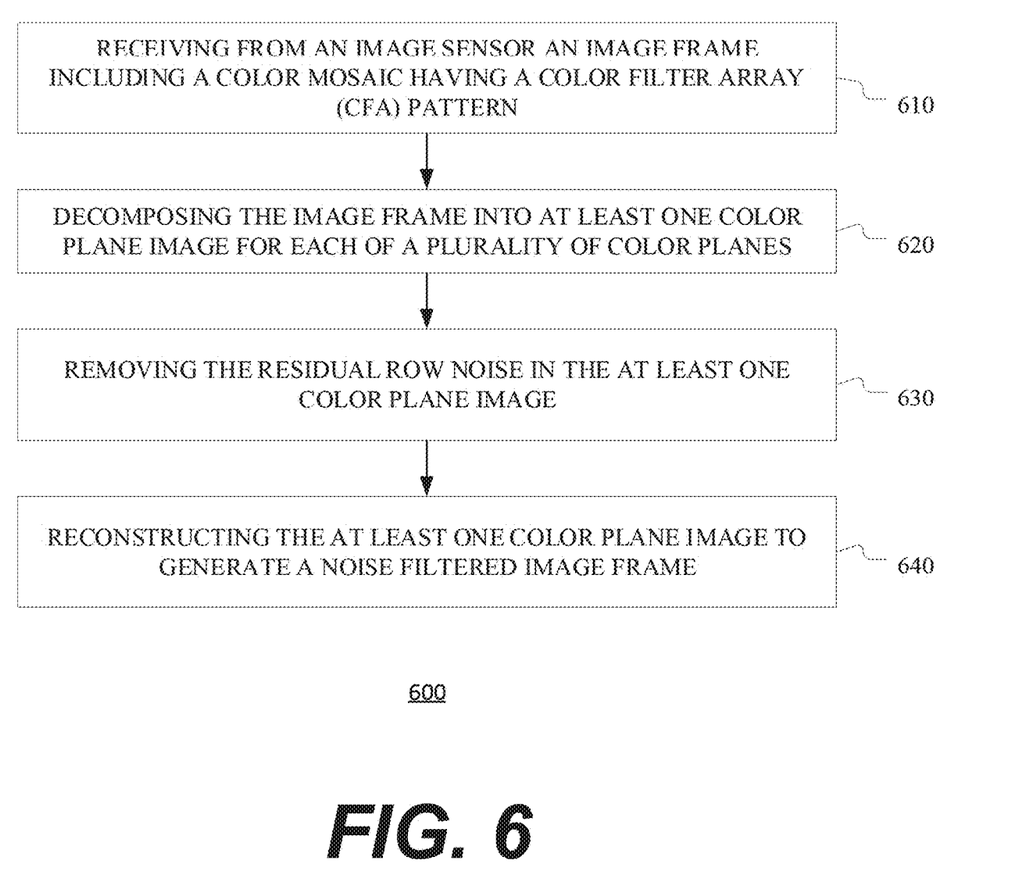
FIG. 6 is a flow chart depicting operations performed by the image processing apparatus to remove residual row noise according to an exemplary embodiment of the disclosure.

Reference is now made to FIG. 6 (with continued reference to FIGS. 1 to 5), which illustrates a flow chart of method 600 for removing residual row noise. Method 600 is performed by image processors 130 and 342 for each color plane image. Method 600 begins at step 610 where the image processors 130 and 342 receive an image frame including a color mosaic having a CFA pattern via image pre-buffer 120 (or still image pre-buffer 334, respectively) from the image sensor 110. Method 600 continues to step 620 at which the image frame is decomposed by the image processors 130 and 342 into at least one color plane image for each of a plurality of color planes, e.g., in red color plane image 220, green color plane image 230, and blue color plane image 240.

At step 630, residual row noise in the at least one color plane image is removed. The method concludes with step 640 at which the at least one color plane image is reconstructed to generate a corrected color plane image.

Referring back to FIG. 1, memory 150 is described in more detail. According to an exemplary embodiment of the invention, memory 150 is a non-transitory computer readable storage media encoded with software including computer executable instructions that when executed by image processor 130 cause the image processor 130 to receive from the image sensor 110 an image frame including a color mosaic having a CFA pattern, decompose the image frame into at least one color plane image 510 for each of a plurality of color planes, remove residual row noise in the at least one color plane image, and reconstruct the at least one color plane image to generate a corrected color plane image 560. Image processor 130 may be implemented as a single processor or as a plurality of processors.

It is understood that the foregoing description is that of the exemplary embodiments of the invention and that various changes and modifications may be made thereto without departing from the spirit and scope of the invention as defined in the appended claims.

What is claimed is:

1. A method for removing residual row noise, the method comprising:
    receiving from an image sensor an image frame including a color mosaic having a color filter array (CFA) pattern;
    decomposing the image frame into at least one color plane image for each of a plurality of color planes;
    removing the residual row noise in the at least one color plane image by:
    dividing the at least one color plane image into a plurality of vertical stripes having stripe pixels with stripe pixel values;
    dividing each of the plurality of vertical stripes into horizontal stripe rows defining stripe row pixels with stripe row pixel values and vertical stripe columns defining stripe column pixels with stripe column pixels;
    for each of the plurality of vertical stripes:
        selecting non-masked pixels by masking out the stripe pixels with the stripe pixel values that are larger than a predetermined pixel value;
        determining a row means profile by determining row mean values for each of the horizontal stripe rows;
        determining a smoothed row means profile by applying a filter to the row mean values thereby generating smoothed row means values for each of the horizontal stripe rows;
        determining row offset values for each of the horizontal stripe rows by subtracting the smoothed row means values from the row mean values;
        determining corrected row offset values for each of the horizontal stripe rows based on corresponding row offset values of adjacent vertical stripes; and
        subtracting the corrected row offset value from the stripe pixel values.

2. The method of claim 1, further comprising:
    reconstructing the at least one color plane image to generate a corrected color plane image.

3. The method of claim 1, wherein the plurality of color planes includes at least one of a green color plane, a red color plane, and a blue color plane.

4. The method of claim 1, wherein the filter is at least one of an edge-preserving filter, a bilateral filter, a guided filter, and a moving average filter.

5. The method of claim 1, wherein determining the corrected row offset values for each of the horizontal stripe rows of a vertical stripe includes determining a corrected row offset value for each of the horizontal stripe rows of the vertical stripe by linear interpolating each of the corrected row offset values from offset values in a same horizontal stripe row (a) of a first vertical stripe preceding the vertical stripe in a horizontal direction, and (b) of a second vertical stripe succeeding the vertical stripe in the horizontal direction.

6. An image processing apparatus for removing residual row noise, the image processing apparatus comprising:
    one or more processors in communication with an image sensor;
    one or more memory devices in communication with the one or more processors;
    wherein the one or more processors are configured to:
    receive from an image sensor an image frame including a color mosaic having a color filter array (CFA) pattern;
    decompose the image frame into at least one color plane image for each of a plurality of color planes;
    remove the residual row noise in the at least one color plane image by:
    dividing the at least one color plane image into a plurality of vertical stripes having stripe pixels with stripe pixel values;
    dividing each of the plurality of vertical stripes into horizontal stripe rows defining stripe row pixels with stripe row pixel values and vertical stripe columns defining stripe column pixels with stripe column pixels;
    for each of the plurality of vertical stripes:
        selecting non-masked pixels by masking out the stripe pixels with the stripe pixel values that are larger than a predetermined pixel value;
        determining a row means profile by determining row mean values for each of the horizontal stripe rows;
        determining a smoothed row means profile by applying a filter to the row mean values thereby generating smoothed row means values for each of the horizontal stripe rows;
        determining row offset values for each of the horizontal stripe rows by subtracting the smoothed row means values from the row mean values;
        determining corrected row offset values for each of the horizontal stripe rows based on corresponding row offset values of adjacent vertical stripes; and
        subtracting the corrected row offset value from the stripe pixel values.

7. The image processing apparatus of claim 6, wherein the one or more processors are further configured to:
    reconstruct the at least one color plane image to generate a noise filtered image frame.

8. The image processing apparatus of claim 6, wherein the plurality of color planes includes at least one of a green color plane, a red color plane, and a blue color plane.

9. The image processing apparatus of claim 6, wherein the filter is at least one of an edge-preserving filter, a bilateral filter, a guided filter, and a moving average filter.

10. The image processing apparatus of claim 6, wherein determining the corrected row offset values for each of the horizontal stripe rows of a vertical stripe includes determining a corrected row offset value for each of the horizontal stripe rows of the vertical stripe by linear interpolating each of the corrected row offset values from offset values in a same horizontal stripe row (a) of a first vertical stripe preceding the vertical stripe in a horizontal direction, and (b) of a second vertical stripe succeeding the vertical stripe in the horizontal direction.

11. A non-transitory computer readable storage medium encoded with software comprising computer executable instructions that when executed by one or more processors cause the one or more processors to:
    receive from an image sensor an image frame including a color mosaic having a color filter array (CFA) pattern;
    decompose the image frame into at least one color plane image for each of a plurality of color planes;
    remove the residual row noise in the at least one color plane image by:
    dividing the at least one color plane image into a plurality of vertical stripes having stripe pixels with stripe pixel values;

dividing each of the plurality of vertical stripes into horizontal stripe rows defining stripe row pixels with stripe row pixel values and vertical stripe columns defining stripe column pixels with stripe column pixels;

for each of the plurality of vertical stripes:

selecting non-masked pixels by masking out the stripe pixels with the stripe pixel values that are larger than a predetermined pixel value;

determining a row means profile by determining row mean values for each of the horizontal stripe rows;

determining a smoothed row means profile by applying a filter to the row mean values thereby generating smoothed row means values for each of the horizontal stripe rows;

determining row offset values for each of the horizontal stripe rows by subtracting the smoothed row means values from the row mean values;

determining corrected row offset values for each of the horizontal stripe rows based on corresponding row offset values of adjacent vertical stripes; and subtracting the corrected row offset value from the stripe pixel values.

12. The non-transitory computer readable storage medium of claim 11, wherein the executable instructions further cause the one or more processors to:

reconstruct the at least one color plane image to generate a noise filtered image frame.

13. The non-transitory computer readable storage medium of claim 11, wherein the plurality of color planes includes at least one of a green color plane, a red color plane, and a blue color plane.

14. The non-transitory computer readable storage medium of claim 11, wherein the filter is at least one of an edge-preserving filter, a bilateral filter, a guided filter, and a moving average filter.

15. The non-transitory computer readable storage medium of claim 11, wherein determining the corrected row offset values for each of the horizontal stripe rows of a vertical stripe includes determining a corrected row offset value for each of the horizontal stripe rows of the vertical stripe by linear interpolating each of the corrected row offset values from offset values in a same horizontal stripe row (a) of a first vertical stripe preceding the vertical stripe in a horizontal direction, and (b) of a second vertical stripe succeeding the vertical stripe in the horizontal direction.

* * * * *